United States Patent
Nozu et al.

(10) Patent No.: US 7,206,077 B2
(45) Date of Patent: Apr. 17, 2007

(54) FLYING HEIGHT TESTER AND FLYING HEIGHT TEST METHOD

(75) Inventors: Takashi Nozu, deceased, late of Kanagawa-ken (JP); by Yuka Nozu, legal representative, Kanagawa-ken (JP); Teiji Hisano, Kanagawa-ken (JP)

(73) Assignee: International Manufacturing and Engineering Services Co., Ltd., Fujisawa-shi (JP)

( * ) Notice: Subject to any disclaimer, the term of this patent is extended or adjusted under 35 U.S.C. 154(b) by 221 days.

(21) Appl. No.: 10/993,669

(22) Filed: Nov. 19, 2004

(65) Prior Publication Data
US 2005/0117166 A1    Jun. 2, 2005

(30) Foreign Application Priority Data
Nov. 20, 2003   (JP)   ............................. 2003-390054

(51) Int. Cl.
*G01B 11/02*   (2006.01)
(52) U.S. Cl. ....................................... 356/507
(58) Field of Classification Search ................ 356/505, 356/506, 507
See application file for complete search history.

(56) References Cited

U.S. PATENT DOCUMENTS 5,280,340 A * 1/1994 Lacey ........................ 356/507
6,181,458 B1 * 1/2001 Brazas et al. ............... 359/290
6,665,077 B1 * 12/2003 Stirniman et al. ........... 356/507

FOREIGN PATENT DOCUMENTS

| JP | 6-147841 | 5/1994 |
| JP | 7-503315 | 6/1995 |
| JP | 7-65331 | 10/1995 |
| JP | 8-507384 | 6/1996 |
| WO | WO 95/17646 | 6/1995 |

\* cited by examiner

*Primary Examiner*—Gregory J. Toatley, Jr.
*Assistant Examiner*—Michael A. Lyons
(74) *Attorney, Agent, or Firm*—McCormick, Paulding & Huber LLP

(57) ABSTRACT

A flying height tester includes a glass disc facing a magnetic head slider under test; an optical system for guiding light to the glass disc so that multiple reflections of light occur between the glass disc and the magnetic head slider; a light sensor receiving reflection light from the glass disc to output light intensity data; and a processor which calculates back the flying height based on an output function of the light sensor. The processor calibrates intensity gain data and intensity offset data of the output function using the data obtained in a pseudo-zero state of the flying height. This pseudo-zero state is obtained by applying an index matching liquid between a first-calibration magnetic head slider, having the same optical constants as the magnetic head slider under test, and the glass disc, the index matching liquid having a refractive index identical to the glass disc.

12 Claims, 6 Drawing Sheets

FLYING HEIGHT TESTER AND FLYING HEIGHT TEST METHOD

CROSS REFERENCE TO RELATED APPLICATION

The present application is related to and claims priority of the following Japanese Patent Application No. 2003-390054 filed on Nov. 20, 2003.

BACKGROUND OF THE INVENTION

1. Field of the Invention

The present invention relates to a flying height tester and a flying height test method which determines the flying height optically with the phenomenon of multiple reflections produced between a glass disc and a magnetic head slider.

2. Description of the Related Art

The magnetic head (read/write head), which is an element of a magnetic read/write system, flies at a small air gap from the, surface of the spinning magnetic recording disc. The flying height of a magnetic head is usually tested using a flying height tester (FHT) in a form of a head gimbal assembly (HGA), according to the specifications thereof.

Various types of flying height testers have been developed. A particular type of flying height tester which determines the flying height optically with the phenomenon of multiple reflections has been widely used.

Such a particular type of flying height tester is provided with a transparent glass disc as a substitute for a magnetic disc. The flying height is determined with this type of flying height tester in the following procedure.

Firstly, the glass disc is driven to spin in a state where a light beam emitted from a light source is guided perpendicularly on an upper surface of the glass disc. Subsequently, a magnetic head slider is brought to a state in which the slider faces the spinning glass disc so that the magnetic head slider flies over a spinning disc while maintaining a small air gap against the disc surface. Thereupon, the illuminated light from the upper surface of the glass disc is reflected more than once between a lower surface of the glass disc and an upper surface of the magnetic head slider, as shown in FIG. 2, due to the differences in refractive index among the glass disc, the magnetic head slider and the air in the gap between the glass disc and the magnetic head slider. Subsequently, light rays reflected by the lower surface of the glass disc and the upper surface of the magnetic head slider are received by a light sensor (photosensor) to determine the intensity of the reflected light, and the flying height is derived from this determined intensity.

The reflectivity R of the lower surface of the glass disc is expressed as a function of the flying height (flying height vector) x as shown by the following theoretical formulas (1), (2) and (3):

$$R(\vec{x}) = \frac{R_{12} + R_{23} - 2r_{12}r_{23}\cos(\vec{\alpha x} - \phi)}{1 + R_{12}R_{23} + 2r_{12}r_{23}\cos(\vec{\alpha x} - \phi)} \quad (1)$$

$$r_{12} = \frac{n_1 - 1}{n_1 - 1}, R_{12} = r_{12}^2, r_{23} = \sqrt{\frac{(1-n_3)^2 + k_3^2}{(1-n_3)^2 + k_3^2}}, R_{23} = r_{23}^2 \quad (2)$$

$$\alpha = \frac{4\pi}{\lambda}, \phi = \tan^{-1}\left[\frac{k_3}{1-n_3}\right] + \tan^{-1}\left[\frac{k_3}{1+n_3}\right] \quad (3)$$

wherein the refractive index of the air in the gap between the glass disc and the magnetic head slider is defined as 1;

wherein R represents the reflectivity of the lower surface of the glass disc;

$n_1$ represents the refractive index of the glass disc;

$n_3$ represents the refractive index (optical constant) of the magnetic head slider;

$k_3$ represents the extinction coefficient (optical constant) of the magnetic head slider; and $\lambda$ represents the wavelength of the reflected light.

If the reflectivity R(x) of a lower surface of the glass disc which is positioned directly above the magnetic head slider is known, the flying height x which corresponds to the reflectivity R(x) can be derived from the above theoretical formulas (1), (2) and (3). However, the reflectivity R and the flying height x are calculated back from light intensity data I based on the following theoretical formula (4) since data obtained by the light sensor is not the reflectivity R but the light intensity data I:

$$\vec{I} = GR(\vec{X}) + \text{offset} \quad (4)$$

In the above theoretical formula (4), the intensity gain data G and the intensity offset data OFFSET need to be calibrated prior to the measurement of the flying height.

Conventionally, the intensity of the reflected light (light intensity data) is obtained for each of different flying states of the magnetic head slider. Thereafter, the intensity gain data G and the intensity offset data OFFSET are calibrated using a peak value (maximum value) Imax and a valley value (minimum value) Imin of the obtained light intensity data I in accordance with function data (i.e., output function of the light sensor; see FIG. 11). The function data is previously derived from the distance between the glass disc and the magnetic head slider and the light intensity data, for each wavelength region in accordance with an optical theory. Such a conventional calibration method is disclosed in the following documents: Japanese patent application Laid-open No. 6-147841, Japanese patent application Laid-open No. 7-65331, Japanese patent application Laid-open No. 7-503315 and Japanese patent application Laid-open No. 8-507384.

As described above, it has been previously necessary to obtain the light intensity data I, which includes both the peak value (maximum value) Imax and the valley value (minimum value) Imin, in order to calibrate the intensity gain data G and the intensity offset data OFFSET. For instance, assuming that the light emitted from a light source consists of three primary colors: RGB (red, green and blue), the range of the flying height which is necessary for obtaining light-intensity data I' ($I_R'$, $I_G'$ and $I_B'$ at wavelengths R, G and B, respectively) for calibration becomes maximum at wavelength R as shown in FIG. 9. Specifically, the magnetic head slider needs to be lifted by approximately the order of 300 nm. If only the light-intensity data $I_B'$ at wavelength B is intended to be used, the magnetic head slider needs to be lifted by approximately 220 through 230 nm.

In recent years, the surface recording density of magnetic discs has been increased remarkably, and the flying height is becoming smaller as the surface recording density of magnetic disc increases. The flying height is, at present, approximately 20 nm, and it is anticipated that the flying height will be reduced to 10 nm or less in the future. In addition, current magnetic head sliders are designed to fly relative to the magnetic disc while remaining parallel to the magnetic disc (with a small pitch between magnetic head slider and magnetic disc) so as to ensure a stable flying position. Therefore, it is difficult to secure the maximum flying height value necessary for obtaining the light intensity data I' for calibration even if the magnetic head flies under different load conditions as well as a single load condition. On this account, it is sometimes the case that the valley value Imin of the light intensity data I cannot be obtained. If the valley value Imin is not obtained, the accuracy of calibration of the intensity gain data G and the intensity offset data OFFSET deteriorates, and in the worst scenario, the intensity gain data G and the intensity offset data OFFSET cannot be calibrated.

It is known that the light intensity data I, in a state where the flying height is nearly zero (10 nm or less), greatly depends on the refractive index $n_3$ and the extinction coefficient $k_3$ of the magnetic head slider. The refractive index $n_3$ and the extinction coefficient $k_3$ of the magnetic head slider are values measured by an external measuring device such as an ellipsometer. Therefore, if measurement errors occur in refractive index $n_3$ and the extinction coefficient $k_3$, such measurement errors have a great influence on the determination of the absolute flying height to thereby cause an offset error in the flying height.

SUMMARY OF THE INVENTION

The present invention has been devised in view of the problems noted above, and provides a flying height tester and a flying height test method, each of which makes it possible to determine the magnetic head flying height with a high degree of precision even if the flying height is minimal.

According to an aspect of the present invention, a flying height tester is provided, including a glass disc positioned to face a magnetic head slider under test; an optical system for guiding light to the glass disc so that multiple reflections of the light occur between the glass disc and the magnetic head slider; a light sensor which receives reflection light from the glass disc to output light intensity data corresponding to an amount of the reflection light received; and a processor which calculates back the flying height from the light intensity data of the test magnetic head slider based on an output function of the light sensor, wherein the light intensity data and the flying height have a predetermined relationship expressed by the output function. The processor calibrates intensity gain data and intensity offset data of the output function using the light intensity data obtained in a pseudo-zero state of the flying height. The pseudo-zero state of the flying height is obtained by applying an index matching liquid between a first-calibration magnetic head slider, having optical constants substantially the same as those of the magnetic head slider under test, and the glass disc, the index matching liquid having a refractive index identical to that of the glass disc.

It is desirable for processor to calibrate the intensity gain data and the intensity offset data with a peak value of the light intensity data on one of a peak-value-detecting magnetic head slider, the first-calibration magnetic head slider and the magnetic head slider under test, wherein the peak-value-detecting magnetic head slider has optical constants substantially the same as those of the magnetic head slider under test.

It is desirable for light sensor to be a CCD camera capable of capturing the light intensity data, which corresponds to an amount of light received by a light-receptive area of the CCD camera, as a single image.

With this arrangement, the light intensity data on the entire surface of the magnetic head slider (i.e., on the surface of the magnetic head slider at a plurality of measurement points thereon) can be captured at the same time, and a flying height curved surface on the entire surface of the magnetic head slider can be determined using this light intensity data, which improves the processing speed.

It is desirable for the optical system to be a microscope through which light is guided to the glass disc.

It is desirable for a gap between the first-calibration magnetic head slider and the glass disc to be filled with the index matching liquid so that no air gap is formed therebetween.

It is desirable for the CCD camera to be a digital three-CCD camera.

The flying height tester can include an X-Y stage to which a air spindle motor is mounted, wherein the glass disc is fixed to a rotary shaft of the air spindle motor to spin by the motor.

In another embodiment, a flying height test method is provided, which includes preparing a magnetic head slider under test, and a first-calibration magnetic head slider having optical constants substantially the same as those of the magnetic head slider under test; positioning the first-calibration magnetic head slider and a glass disc so as to face each other, and filling a gap between the first-calibration magnetic head slider and the glass disc with an index matching liquid to make a pseudo-zero state of the flying height, the index matching liquid having a refractive index identical to that of the glass disc; guiding light to the glass disc so that multiple reflections of the light occur between the glass disc and the magnetic head slider, and making a light sensor receive reflected the light from the glass disc to obtain light intensity data in the pseudo-zero state of the flying height; removing the first-calibration magnetic head slider, and replacing the glass disc with another glass disc that is dedicated for flying height calibration or measurement; spinning the other glass disc, and loading the magnetic head slider under test on a face of the spinning glass disc; guiding the light to the spinning glass disc so that multiple reflections of the light occur between the spinning glass disc and the test magnetic head slider, and making the light sensor receive reflected the light from the spinning glass disc to obtain light intensity data of the test magnetic head slider; calibrating intensity gain data and intensity offset data of an output function of the light sensor with the light intensity data obtained in the pseudo-zero state of the flying height, wherein the light intensity data and the flying height have a predetermined relationship expressed by the output function; and calculating back the flying height from the light intensity data on the magnetic head slider under test based on the output function after the calibration step.

The flying height test method can include preparing a peak-value-detecting magnetic head slider in advance which has optical constants substantially the same as those of the test magnetic head slider; spinning the glass disc, and loading one of the peak-value-detecting magnetic head slider, the first-calibration magnetic head slider, and the magnetic head slider under test on a face of the spinning glass disc; and guiding light to the spinning glass disc so that multiple reflections of the light occur between the spinning glass disc and the one magnetic head slider to obtain a peak value of the light intensity data on the one magnetic head slider. The peak value is used to calibrate the intensity gain data and the intensity offset data.

A CCD camera capable of capturing the light intensity data, which corresponds to an amount of light received by a light-receptive area of the CCD camera, as a single image can be used as the light sensor.

It is desirable for the glass disc to be fixed to a rotary shaft of an air spindle motor so as to spin by the air spindle motor, wherein the air spindle motor is mounted on an x-y stage.

In another embodiment, a flying height test method is provided, which includes preparing a magnetic head slider under test, and a first-calibration magnetic head slider having optical constants substantially the same as those of the magnetic head slider under test; preparing a fixed glass disc and a rotary glass disc which is fixed to a rotary shaft of an air spindle motor, wherein the fixed glass disc and the air spindle motor are mounted on a common x-y stage; positioning the first-calibration magnetic head slider and the fixed glass disc so as to face each other, and filling a gap between the first-calibration magnetic head slider and the fixed glass disc with an index matching liquid to make a pseudo-zero state of the flying height, the index matching liquid having a refractive index identical to that of the fixed glass disc; guiding light to the fixed glass disc so that multiple reflections of the light occur between the fixed glass disc and the magnetic head slider, and making a light sensor receive reflected the light from the fixed glass disc to obtain light intensity data in the pseudo-zero state of the flying height; removing the first-calibration magnetic head slider, and moving the x-y stage so that the rotary glass disc is available for testing instead of the fixed glass disc; spinning the rotary glass disc, and loading the test magnetic head slider on a face of the spinning rotary glass disc; guiding the light to the rotary glass disc so that multiple reflections of the light occur between the rotary glass disc and the magnetic head slider under test, and making the light sensor receive reflected the light from the rotary glass disc to obtain light intensity data of the magnetic head slider under test; calibrating intensity gain data and intensity offset data of an output function of the light sensor with the light intensity data obtained in the pseudo-zero state of the flying height, wherein the light intensity data and the flying height have a predetermined relationship expressed by the output function; and calculating back the flying height from the light intensity data on the magnetic head slider under test based on the output function after the calibrating step.

According to the present invention, the maximum flying height necessary for obtaining the light intensity data which is to be used for calibration is dropped drastically since the output function of the light sensor is calibrated using the light intensity data Izero obtained in the pseudo-zero state of the flying height instead of a conventional valley value (minimum value) Imin of the obtained light intensity data. Accordingly, even if the flying height of a magnetic head slider under test is so small that the maximum flying height value necessary for obtaining the light intensity data for calibration cannot be secured (i.e., the flying height thereof is so small that the valley value Imin cannot be obtained), the output function can be calibrated with precision, which makes it possible to determine flying height with a high degree of precision.

Moreover, the flying height can be measured with a high degree of precision independently of measurement errors in the optical constants (refractive index $n_3$ and extinction coefficient $k_3$) of the magnetic head slider, especially in a range in the vicinity of zero of the flying height (in a range of 10 nm and below of the flying height) because the pseudo-zero state of the flying height is made to obtain the light intensity data Izero.

Furthermore, the pseudo-zero state of the flying height can be made stably and easily under no influence of crown or camber of the magnetic head because the pseudo-zero state of the flying height is achieved by applying a liquid having a refractive index identical to that of the glass disc between the glass disc and the magnetic head slider.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
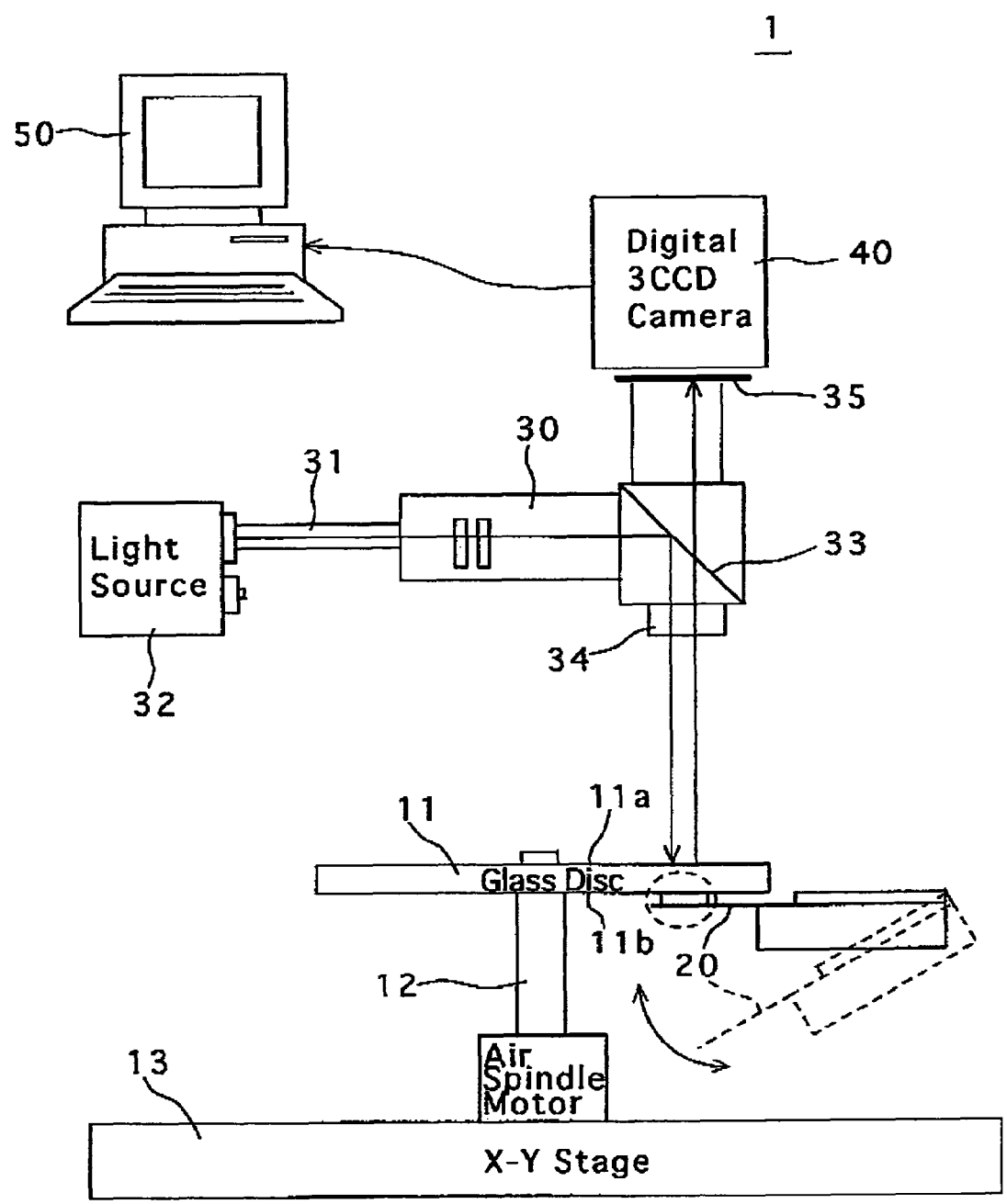
FIG. 1 is a schematic diagram of an embodiment of a flying height tester according to the present invention.

FIG. 1 is a schematic diagram of an embodiment of a flying height tester 1 according to the present invention. The flying height tester 1 is provided with a rotatable transparent glass disc 11 as a substitute for a magnetic disc (magnetic recording media), and operates to measure a flying height of a magnetic head slider 20 which is biased in a direction to come into pressing contact with a lower surface 11b of the glass disc 11 from the lower side of the glass disc 11 by a slight spring force while the glass disc 11 is spinning. In this particular embodiment of the flying height tester 1, a distance between a surface (the lower surface 11b) of the glass disc 11 and a slider surface of the magnetic head slider 20 is measured as the flying height of the magnetic head slider 20. Note that the slider surface of the magnetic head slider 20 refers to a mirror-finished air bearing surface (ABS)

having a predetermined shape (pattern) in plane view to which the magnetic head is operably fixed.

The glass disc 11 is supported on a rotary shaft of an air spindle motor 12 to be rotated thereby. The air spindle motor 12 is mounted to an X-Y stage 13. A combination of the air spindle motor 12 and the X-Y stage 13 serves as a drive mechanism for setting up dummy load conditions (Radius, Skew and RPM) of the magnetic head slider 20. Accordingly, in the present embodiment of the flying height tester 1, though the position of the magnetic head slider 20 is fixed during testing, the magnetic head slider 20 moves two-dimensionally in X-direction and Y-direction on a lower surface of the spinning glass disc 11 by moving the glass disc 11 in X-direction and Y-direction via the X-Y stage 13. Therefore, an equivalent state to a state of the magnetic head slider 20 actually making access to a magnetic disc is obtained. The speed (RPM) of the glass disc 11 is controlled by the air spindle motor 12.

The magnetic head slider 20 is a head gimbal assembly (HGA), and is thus cemented to the top of a gimbal together with a suspension structure. The magnetic head slider 20 is pressed against the lower surface 11b of the glass disc 11 with a predetermined force by the suspension structure when the glass disc 11 is standing still, and flies over the spinning disc keeping a small air gap against the lower surface 11b of the glass disc 11 when it spins. According to FIG. 1, the magnetic head slider 20 is forced down by air currents generated on the lower surface 11b of the glass disc 11 when the glass disc 11 spins.

Figure 2:
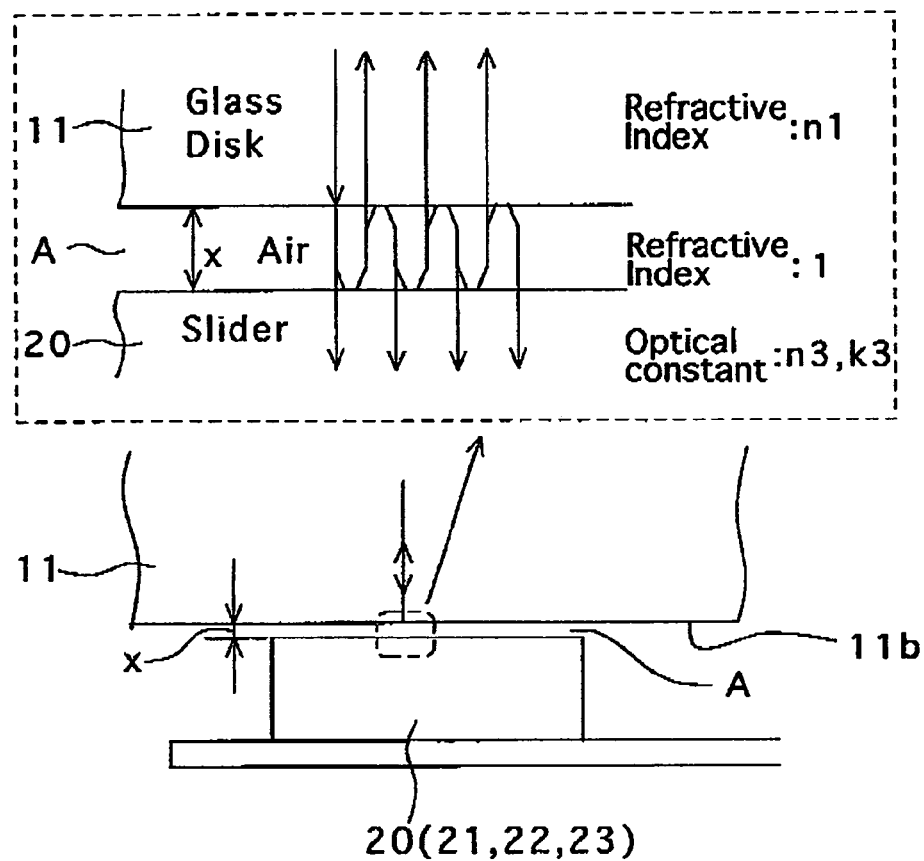
FIG. 2 is an explanatory diagram illustrating light rays of multiple reflections occurring between a glass disc and a magnetic head slider.

The flying height tester 1 is provided above the glass disc 11 with a microscope 30 and a light sensor 40, in that order from an upper surface 11a of the glass disc 11. A light source 32 is connected to the microscope 30 via a fiber-optic cable 31. For instance, a stabilized light source (e.g., halogen lamp) with a feedback stabilization capability is used as the light source 32. Light emitted from the light source 32 enters the microscope 30 via the fiber-optic cable 31, and is bent downwards perpendicularly to be guided to space A (see FIG. 2) between the glass disc 11 and the magnetic head slider 20 via an objective lens 34. An optical system of the flying height tester 1 which includes the objective lens 34 is a coaxial incident light type, so that the light which is oriented to travel downwards from the objective lens 34 is incident on each of the upper surface 11a and the lower surface 11b of the glass disc 11, and an upper surface of the magnetic head slider 20 in a direction substantially perpendicular thereto. Since the space A, the glass disc 11 and the magnetic head slider 20 have mutually different optical constants, light rays of such incident light are multi-reflected in the space A as shown in FIG. 2. Reflected light rays caused by this multiple reflections in the space A travel back toward the microscope 30 to be incident on a half mirror 33, positioned inside the microscope 30, via the objective lens 34 to be guided to the light sensor 40 by the half mirror 33 and an eyepiece lens 35.

Figure 3:
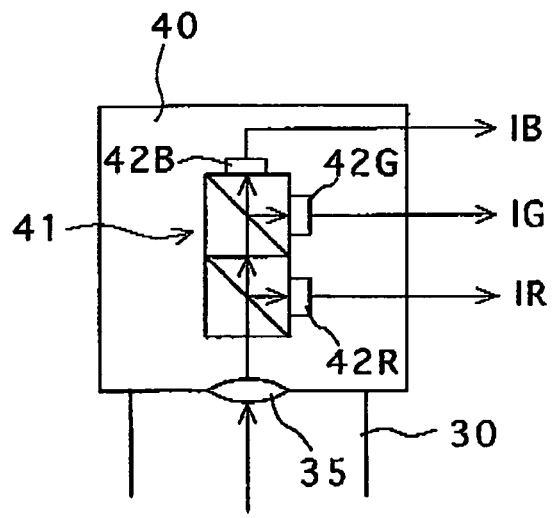
FIG. 3 is a schematic representation of a light sensor shown in FIG. 1.
Figure 4:
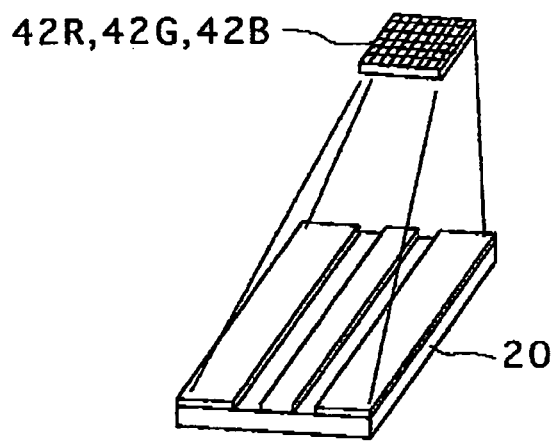
FIG. 4 is an explanatory diagram illustrating a light receiving area (range of capture of light intensity data) of the light sensor shown in FIG. 1.

A digital three-CCD camera which is connected to the eyepiece lens 35 of the microscope 30 is adopted as the light sensor 40 in this particular embodiment of the flying height tester 1. The light sensor 40 is provided with an RGB separation filter 41 and a three CCD arrays 42R, 42G and 42B as shown in FIG. 3. The RGB separation filter 41 separates the incident light thereon into respective wavelength regions of red light, green light and blue light. The three CCD arrays 42R, 42G and 42B receive red, green and blue lights reflected from the glass disc 11, and output three voltage signals (light-intensity data I ($I_R$, $I_G$ and $I_B$ at wavelengths R, G and B, respectively)) corresponding to the amounts of red light, green light and blue light received, respectively. The light sensor 40 captures an RGB image of the whole view of a surface of the magnetic head slider 20 which includes read/write gaps thereon as shown in FIG. 4 to detect the light intensity data I ($I_R$, $I_G$ and $I_B$ at wavelengths R, G and B, respectively) of every pixel. In the following descriptions, the light intensity data $I_R$, $I_G$ and $I_B$ at wavelengths R, G and B altogether are regarded as light intensity data I unless otherwise specified.

In the operation determining whether the magnetic head slider 20 is defective or not, warpage of the slider surface of the magnetic head slider 20 and inclination of the magnetic head slider 20 during the time the magnetic head slider 20 flies, in addition to the flying height in the vicinity of the read/write gaps, are important evaluation items. In evaluating these items, each of the warpage and the inclination needs to be measured at different points on the upper surface of the magnetic head slider 20. In the present embodiment of the flying height tester 1, the light intensity data I can be obtained at the same time for the entire surface of the magnetic head slider 20, i.e., at different points of measurement on the slider surface of the magnetic head slider 20 without mechanically moving the optical system including the microscope 30.

The light intensity data I detected by the light sensor 40 is output to a processor 50 (see FIG. 1). The processor 50 inputs the light intensity data I to estimate the unknown flying height x (i.e., to calculate back the flying height x from the light intensity data I) in accordance with output function of the light sensor 40 that is previously derived from an optical theory for each wavelength region of the light emitted from the light source 32. The processor 50 calculates a refractive index R(x) of the lower surface 11b of the glass disc 11 at a portion thereof immediately above the magnetic head slider 20 at the flying height x by substituting the input light intensity data I in the output function of the light sensor 40, and further calculates the flying height x by substituting the calculated refractive index R(x) in the aforementioned theoretical formula (1). The processor 50 is provided with an internal memory (not shown) for storage of various types of data.

The output function of the light sensor 40 has been given from the theoretical formula (4), and it is necessary to calibrate coefficients (the intensity gain data G and the offset data OFFSET) included in the theoretical formula (4) appropriately at a preparatory stage prior to the flying height test to improve the precision of measuring the flying height x. The offset data OFFSET includes data on reflection on the upper surface 11a of the glass disc 11, data on internal reflection of the microscope 30, and data on the dark current level of the digital three-CCD camera.

The main features of the present embodiment of the flying height tester 1 are that it makes a pseudo-zero state of the flying height and that the apparatus calibrates the intensity gain data G and the offset data OFFSET with the use of the light intensity data Izero obtained in the pseudo-zero state of the flying height. These features will be discussed more specifically in the following description of a test method of the flying height according to the present invention.

Prior to the commencement of measurement of the flying height, a magnetic head slider under test 21, whose flying height is to be measured, and a calibration slider 22, provided separately from the test magnetic head slider 21, for obtaining various types of data to calibrate the output function of the light sensor 40 are prepared. The calibration slider 22 is made by the same manufacturing process as the magnetic head slider under test 21, and has optical constants substantially the same as those of the magnetic head slider under test 21, i.e., the refractive index $n_3$ and the extinction coefficient $k_3$.

[Obtaining a Pseudo-Zero State Flying Height]

Figure 6:
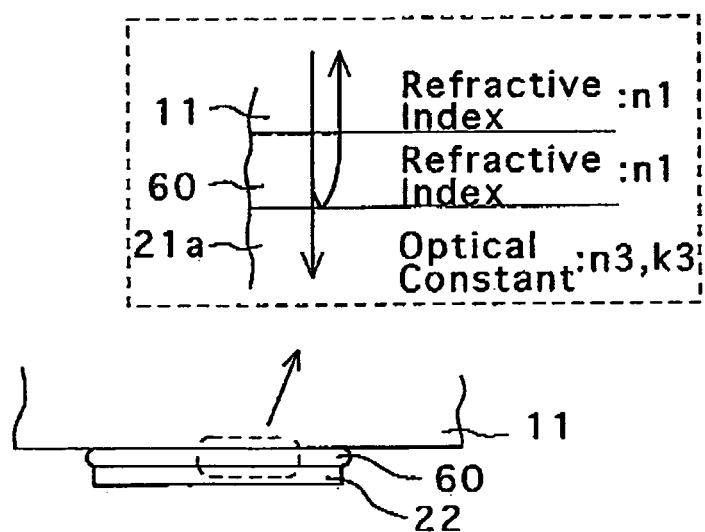
FIG. 6 is an explanatory diagram illustrating a manner of making a pseudo-zero state of the flying height.

After the completion of the above described preliminary arrangements, a liquid with a refractive index identical to that of the glass disc 11 such as an index matching liquid (index matching oil) 60 is applied to an upper surface of the calibration slider 22. Thereafter, this upper surface of the calibration slider 22 that is coated with the index matching liquid 60 is made to face the lower surface 11b of the glass disc 11. At this time, the gap between the glass disc 11 and the calibration slider 22 is filled with the index matching liquid 60 so that no air gap is formed between the glass disc 11 and the calibration slider 22 as shown in FIG. 6. Moreover, no optical border exists in the interface between the index matching liquid 60 and the glass disc 11 since the refractive index of the index matching liquid 60 is the same as that of the glass disc 11. Accordingly, it is understood that a pseudo-zero state of the flying height has been obtained. This pseudo-zero state of the flying height is equivalent to a state where the magnetic head slider 20 is stuck to the glass disc 11 with no optical gap between the magnetic head slider 20 and the glass disc 11. Conventionally, it is generally difficult to make such a pseudo-zero state of the flying height under the influence of crown and camber because the slider surface (air bearing surface) of the magnetic head slider 20 has an elliptic paraboloid shape or a hyperbolic paraboloid shape. Conversely, the pseudo-zero state of the flying height can be made stably and easily under no influence of crown or camber if the index matching liquid 60 is used.

[Achieving Reflected-Light Intensity Data in Pseudo-Zero State of Flying Height]

In the pseudo-zero state of the flying height, the illuminated light from the light source 32 guided perpendicularly on the glass disc 11 is reflected at the surface of the calibration slider 22, and is guided to the light sensor 40 through the objective lens 34, the half mirror 33 and the eyepiece lens 24. At this time, the light sensor 40 receives reflected light from the glass disc 11, and outputs the light intensity data Izero (obtained in the pseudo-zero state of the flying height) to the processor 50. This light intensity data Izero is stored in an internal memory in the processor 50. Afterward, the calibration slider 22 is removed, and the glass disc 11 is replaced with the other glass disc 11 dedicated for flying height calibration or measurement, and the measurement described below is carried out.

However, in an alternative embodiment, a fixed (non-rotatable) glass disc for making the pseudo-zero state of the flying height can be mounted to an x-y stage 13 in addition to the rotatably supported glass disc 11. In this case, the x-y stage 13 is moved so that the fixed glass disc comes under the field of view of the microscope in order to carry out flying height calibration or measurement, and the measurement described below is carried out.

[Detection of Peak Value of Reflected Light Intensity Data]

Figure 5:
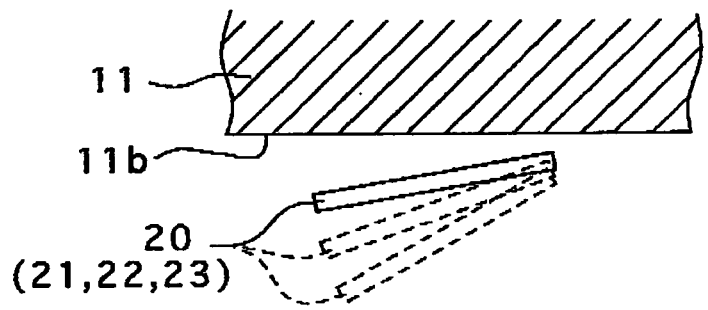
FIG. 5 is an explanatory diagram illustrating different flying states of the magnetic head slider.

Subsequently, the glass disc 11 is driven to spin under normal load conditions (Radius, Skew and RPM), and the magnetic head slider under test 21 is loaded on the lower surface of the spinning glass disc 11. Thereupon, the magnetic head slider under test 21 flies with a small air gap on the lower surface of the spinning glass disc 11, and the light-intensity data I ($I_R$, $I_G$ and $I_B$) is output to the processor 50 from the light sensor 40. In the following descriptions, the light-intensity data I which is detected by the light sensor 40 in a state where the magnetic head slider under test 21 is in a normal flying state is referred to as mensurative light-intensity data. The processor 50 detects the peak value Imax of the input mensurative light-intensity data for each wavelength region, and stores the detected peak value and the associated input mensurative light-intensity data for each wavelength region in memory. If not included in the input mensurative light-intensity data, the peak value Imax is detected by varying the flying state (loading condition) of the magnetic head slider under test 21 as shown in FIG. 5.

[Calibration of Output Function and Determination of Flying Height]

Subsequently, the output function of the light sensor 40 is calibrated using both the peak value Imax of the mensurative light-intensity data and the light intensity data Izero that is obtained in the pseudo-zero state of the flying height. Specifically, both the peak value Imax of the mensurative light-intensity data and the light intensity data Izero that is obtained in the pseudo-zero state of the flying height are fitted in the aforementioned theoretical formula (4) to calibrate the intensity gain data G and the intensity offset data OFFSET. Subsequently, the mensurative light-intensity data is fitted in the calibrated output function of the light sensor 40 to calculate back the flying height x.

Although the magnetic head slider under test 21 is used when the peak value Imax of the mensurative light intensity data in the above described flying height test method, the calibration slider 22 can be used instead. In the case of using the calibration slider 22, the peak value Imax of the mensurative light intensity data needs to be obtained before the light intensity data Izero that is obtained in the pseudo-zero state of the flying height. In addition, another magnetic head slider (peak-value-detecting magnetic head slider) 23 dedicated for detecting the peak value Imax of the mensurative light-intensity data can be prepared independently of the magnetic head slider under test 21 and the calibration slider 22. In the case of using this peak-value-detecting magnetic head slider, the sequence of two steps: the step of obtaining the light intensity data Izero that is obtained in the pseudo-zero state of the flying height, and the step of detecting the peak value Imax of the mensurative light-intensity data becomes optional.

Figure 7:
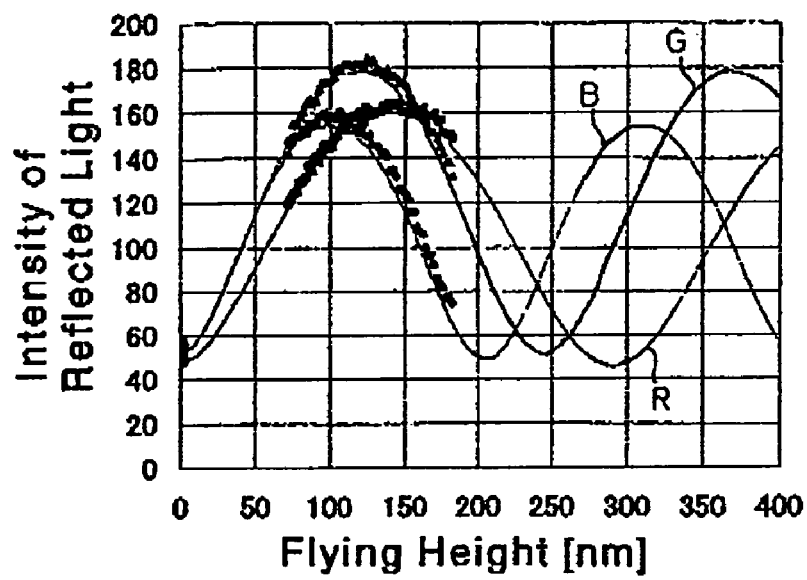
FIG. 7 is a graph showing a relationship between light intensity data I and flying height x in the case of including light intensity data Izero obtained in the pseudo-zero state of the flying height.
Figure 8:
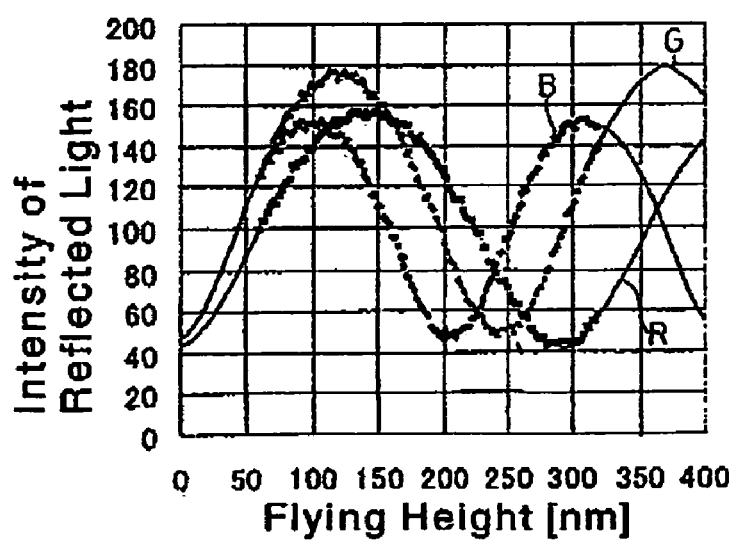
FIG. 8 is a graph showing a relationship between light intensity data I and flying height x in the case of including light intensity data I obtained by a conventional calibration method.
Figure 9:
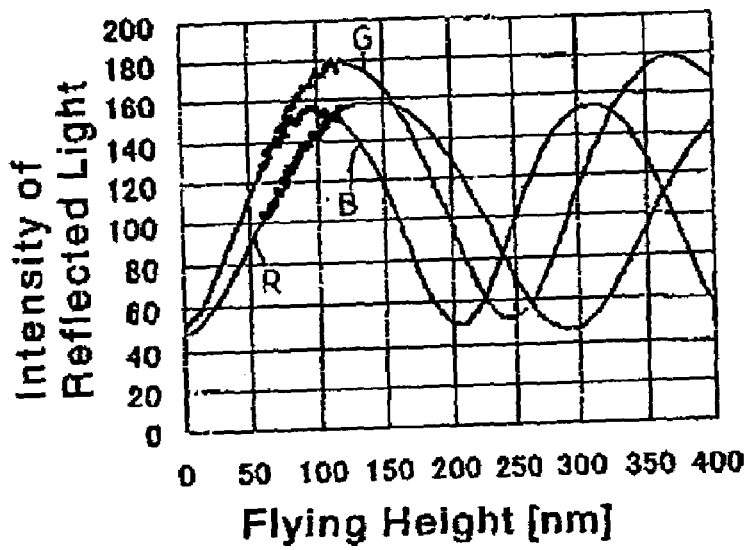
FIG. 9 is a graph showing a relationship between light intensity data I and flying height x in the case of including light intensity data I obtained by a conventional calibration method if the valley value Imin of the obtained light intensities cannot be obtained.

FIG. 7 is a graph showing a relationship between the light intensity data I used for calibrating the output function of the light sensor 40 and the flying height x in the present embodiment of the flying height tester 1. The light intensity data I in this graph includes the light intensity data Izero that is obtained in the pseudo-zero state of the flying height, and the maximum flying height necessary for obtaining the peak value Imax is approximately 180 nm. It can be understood that the maximum flying height required for calibration in FIG. 7 is much smaller than before as compared with the maximum flying height in FIG. 8 in which the intensity gain data G and the intensity offset data OFFSET are calibrated using the peak value Imax and a valley value (minimum value) Imin of the obtained light intensity data, namely using a conventional calibration method. If the maximum flying height necessary for obtaining the peak value Imax is thus reduced drastically, the intensity gain data G and the intensity offset data OFFSET can be calibrated appropriately even on a magnetic head slider in which the maximum flying height value necessary for obtaining the light intensity data for calibration cannot be secured (i.e., the peak value Imax and the valley value Imin of the light intensity data cannot be obtained), as shown in FIG. 9.

In the present embodiment of the flying height tester 1, the absolute flying height can be determined independently of measurement errors in optical constants (refractive index $n_3$ and extinction coefficient $k_3$) of the magnetic head slider 20 since the flying height tester 1 achieves the pseudo-zero state of the flying height to obtain the light intensity data Izero, and calibrates the intensity gain data G and the offset data OFFSET with the obtained light intensity data Izero. Consequently, the flying height can be measured with a high degree of precision, especially in a range in the vicinity of zero of the flying height (in a range of 10 nm and below). In contrast, in a conventional flying height measuring method, it is known for the light intensity data, in a state where the flying height is nearly zero, greatly depends on the refractive index $n_3$ and the extinction coefficient $k_3$ of the magnetic head slider, and measurement errors in these optical constants cause an offset error in the flying height.

Figure 10:
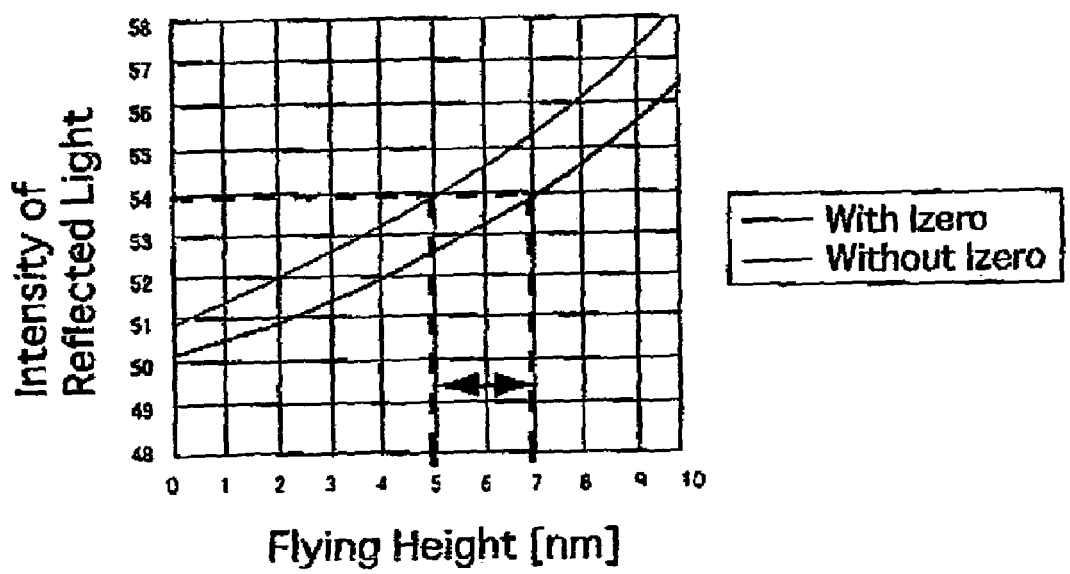
FIG. 10 is a graph showing a relationship between light intensity data I and flying height x in a range in the vicinity of zero of the flying height in the case where the light intensity data Izero is used as a constraint condition of an output function of the light sensor, and another relationship between light intensity data I and flying height x in a range in the vicinity of zero of the flying height in the case where the light intensity data Izero is not used as a constraint condition of an output function of the light sensor, illustrating a comparison of these two relationships.
Figure 11:
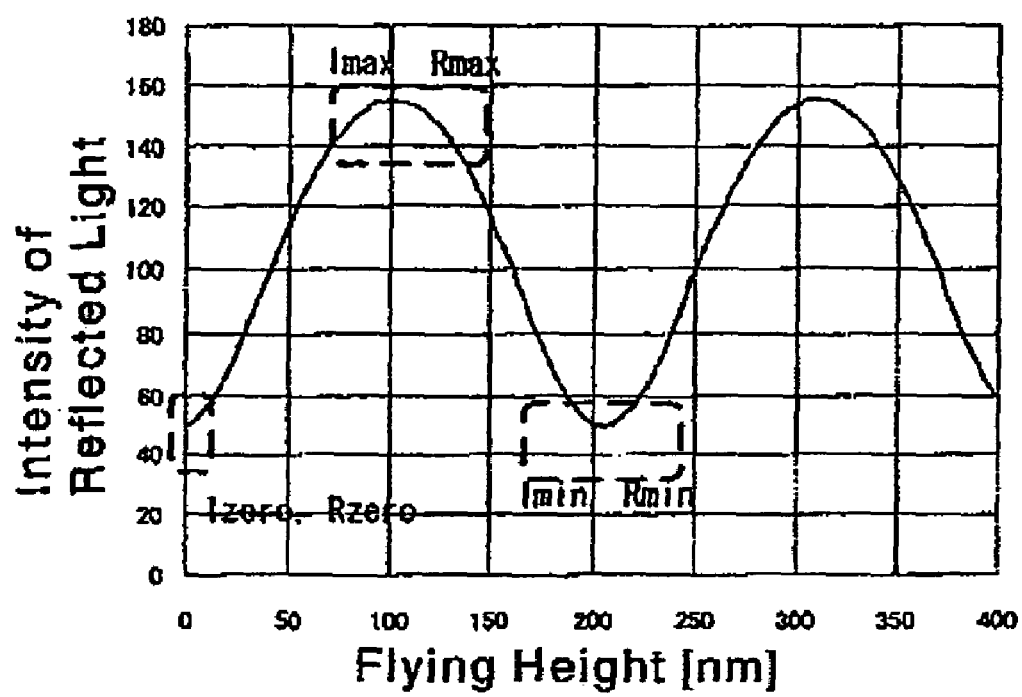
FIG. 11 is a graph showing an output function of the light sensor that is derived from an optical theory.

FIG. 10 is a graph showing a relationship (indicated by a thick solid line) between light intensity data I and flying height x in a range of 10 nm and below of the flying height in the case where the light intensity data Izero is used as a coefficient of an output function of the light sensor 40, and another relationship (indicated by a thin solid line) between light intensity data I and flying height x in a range of 10 nm and below of the flying height in the case where the light intensity data Izero is not used for determining the coefficient of an output function of the light sensor 40. For instance, assuming that the light intensity data I detected by the light sensor 40 is approximately 54, the flying height is estimated to be approximately 7 nm in the case where the intensity gain data G and the intensity offset data OFFSET are calibrated using the light intensity data Izero, whereas the flying height is estimated to be approximately 5 nm in the case where the intensity gain data G and the intensity offset data OFFSET are calibrated without using the light intensity data Izero. The difference in offset error between these two cases is −2 nm, which is not a negligible value. If the light intensity data I detected by the light sensor 40 is approximately 51 or less, the flying height is estimated to be a negative value, thus resulting in a measurement error.

Although reflected light from the lower surface 11b of the glass disc 11 is separated into respective wavelengths of red light, green light and blue light through the RGB separation filter 41 to detect the light-intensity data $I_R$, $I_G$ and $I_B$ in the above illustrated embodiment of the flying height measuring apparatus, the present invention is not limited solely to the three primary colors for the detection of the light-intensity data $I_R$, $I_G$ and $I_B$. For instance, a wavelength band which is shifted to the short-wave side beyond the wavelength of blue light or to the long-wave side beyond the wavelength of red light can be used instead to detect the light-intensity data $I_R$, $I_G$ and $I_B$. Although a stabilized light source (e.g., halogen lamp) with a feedback stabilization capability is used as the light source 32 in the above illustrated embodiment of the flying height measuring apparatus, a laser light emitter which emits a laser light of plural wavelengths (measuring light) can be used as the light source 32. Although a digital three-CCD camera is adopted as the light sensor 40 in the above illustrated embodiment of the flying height measuring apparatus, a black-and-white camera with a rotatable three band filter or a light receiving element such as a photodiode can be used instead of the digital three-CCD camera.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A flying height tester comprising:
    a glass disc positioned to face a magnetic head slider under test;
    an optical system for guiding light to said glass disc so that multiple reflections of said light occur between said glass disc and said magnetic head slider under test;
    a light sensor which receives reflection light from said glass disc to output light intensity data corresponding to an amount of said reflection light received; and
    a processor which calculates back said flying height from said light intensity data of said magnetic head slider under test based on an output function of said light sensor, wherein said light intensity data and said flying height have a predetermined relationship expressed by said output function,
    wherein said processor calibrates intensity gain data and intensity offset data of said output function using the light intensity data obtained in a pseudo-zero state of said flying height,
    wherein said pseudo-zero state of said flying height is obtained by applying an index matching liquid between a first-calibration magnetic head slider, having optical constants substantially the same as those of said magnetic head slider under test, and said glass disc, said index matching liquid having a refractive index identical to that of said glass disc.

2. The flying height tester according to claim 1, wherein said processor further calibrates said intensity gain data and said intensity offset data with a peak value of said light intensity data on one of a peak-value-detecting magnetic head slider, said first-calibration magnetic head slider and said magnetic head slider under test,
    wherein said peak-value-detecting magnetic head slider has optical constants substantially the same as those of said magnetic head slider under test.

3. The flying height tester according to claim 1, wherein said light sensor comprises a CCD camera capable of capturing said light intensity data, which corresponds to an amount of light received by a light-receptive area of said CCD camera, as a single image.

4. The flying height tester according to claim 1, wherein said optical system comprises a microscope through which light is guided to said glass disc.

5. The flying height tester according to claim 1, wherein a gap between said first-calibration magnetic head slider and said glass disc is filled with said index matching liquid so that no air gap is formed therebetween.

6. The flying height tester according to claim 3, wherein said CCD camera comprises a digital three-CCD camera.

7. The flying height tester according to claim 1, further comprising an X-Y stage to which an air spindle motor is mounted,
    wherein said glass disc is fixed to a rotary shaft of said air spindle motor to spin by said air spindle motor.

8. A flying height test method comprising:
    preparing a magnetic head slider under test, and a first-calibration magnetic head slider having optical constants substantially the same as those of said magnetic head slider under test;
    positioning said first-calibration magnetic head slider and a glass disc so as to face each other, and filling a gap between said first-calibration magnetic head slider and said glass disc with an index matching liquid to make a pseudo-zero state of said flying height, said index matching liquid having a refractive index identical to that of said glass disc;

guiding light to said glass disc so that multiple reflections of said light occur between said glass disc and said magnetic head slider, and making a light sensor receive reflected said light from said glass disc to obtain light intensity data in said pseudo-zero state of said flying height;

removing said first-calibration magnetic head slider, and replacing the glass disc with another glass disc that is dedicated for flying height calibration or measurement;

spinning said glass disc, and loading said test magnetic head slider on a face of said spinning glass disc;

guiding said light to said spinning glass disc so that multiple reflections of said light occur between said spinning glass disc and said magnetic head slider under test, and making said light sensor receive reflected said light from said spinning glass disc to obtain light intensity data of said magnetic head slider under test;

calibrating intensity gain data and intensity offset data of an output function of said light sensor with said light intensity data obtained in said pseudo-zero state of said flying height, wherein said light intensity data and said flying height have a predetermined relationship expressed by said output function;

calculating back said flying height from said light intensity data on said magnetic head slider under test based on said output function after said calibrating step; and storing the calculated flying height in a memory of a processor.

9. The flying height test method according to claim 8, further comprising:

preparing a peak-value-detecting magnetic head slider in advance which has optical constants substantially the same as those of said magnetic head slider under test; and spinning said glass disc, and loading one of said peak-value-detecting magnetic head slider, said first-calibration magnetic head slider, and said magnetic head slider under test on a face of said spinning glass disc;

guiding light to said spinning glass disc so that multiple reflections of said light occur between said spinning glass disc and said one magnetic head slider to obtain a peak value of said light intensity data on said one magnetic head slider, wherein said peak value is used to calibrate said intensity gain data and said intensity offset data.

10. The flying height test method according to claim 8, wherein a CCD camera capable of capturing said light intensity data, which corresponds to an amount of light received by a light-receptive area of said CCD camera, as a single image is used as said light sensor.

11. The flying height test method according to claim 8, wherein said glass disc is fixed to a rotary shaft of an air spindle motor so as to spin by said air spindle motor, wherein said air spindle motor is mounted on an x-y stage.

12. A flying height test method comprising:

preparing a magnetic head slider under test, and a first-calibration magnetic head slider having optical constants substantially the same as those of said magnetic head slider under test;

preparing a fixed glass disc and a rotary glass disc which is fixed to a rotary shaft of an air spindle, motor, wherein said fixed glass disc and said air spindle motor are mounted on a common x-y stage;

positioning said first-calibration magnetic head slider and said fixed glass disc so as to face each other, and filling a gap between said first-calibration magnetic head slider and said fixed glass disc with an index matching liquid to make a pseudo-zero state of said flying height, said index matching liquid having a refractive index identical to that of said fixed glass disc;

guiding light to said fixed glass disc so that multiple reflections of said light occur between said fixed glass disc and said magnetic head slider, and making a light sensor receive reflected said light from said fixed glass disc to obtain light intensity data in said pseudo-zero state of said flying height;

removing said first-calibration magnetic head slider, and moving said x-y stage so that said rotary glass disc is available for testing instead of said fixed glass disc;

spinning said rotary glass disc, and loading said test magnetic head slider on a face of said spinning rotary glass disc;

guiding said light to said rotary glass disc so that multiple reflections of said light occur between said rotary glass disc and said magnetic head slider under test, and making said light sensor receive reflected said light from said rotary glass disc to obtain light intensity data of said magnetic head slider under test;

calibrating intensity gain data and intensity offset data of an output function of said light sensor with said light intensity data obtained in said pseudo-zero state of said flying height, wherein said light intensity data and said flying height have a predetermined relationship expressed by said output function;

calculating back said flying height from said light intensity data on said magnetic head slider under test based on said output function after said calibrating step; and storing the calculated flying height in a memory of a processor.

* * * * *